US010500501B2

United States Patent
Kiwada et al.

(10) Patent No.: US 10,500,501 B2
(45) Date of Patent: Dec. 10, 2019

(54) INFORMATION-PROCESSING DEVICE, INFORMATION-PROCESSING SYSTEM, INFORMATION-PROCESSING METHOD, AND STORAGE MEDIUM

(71) Applicant: NINTENDO CO., LTD., Kyoto (JP)

(72) Inventors: Shinpei Kiwada, Kyoto (JP); Takahiro Kawahara, Kyoto (JP); Kenichi Takemoto, Kyoto (JP); Xizhou Xu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/489,864

(22) Filed: Apr. 18, 2017

(65) Prior Publication Data

US 2018/0193753 A1 Jul. 12, 2018

(30) Foreign Application Priority Data

Jan. 6, 2017 (JP) .................... 2017-001383

(51) Int. Cl.
| A63F 9/00 | (2006.01) |
| A63F 13/795 | (2014.01) |
| A63F 13/25 | (2014.01) |
| A63F 13/537 | (2014.01) |
| A63F 13/35 | (2014.01) |

(52) U.S. Cl.
CPC ............ *A63F 13/795* (2014.09); *A63F 13/25* (2014.09); *A63F 13/35* (2014.09); *A63F 13/537* (2014.09)

(58) Field of Classification Search
None
See application file for complete search history.

(56) References Cited

U.S. PATENT DOCUMENTS

| 7,311,608 | B1 * | 12/2007 | Danieli | A63F 13/12 |
| | | | | 463/42 |
| 8,734,255 | B2 * | 5/2014 | van Os | A63F 13/795 |
| | | | | 463/42 |
| 9,027,105 | B1 * | 5/2015 | Saylor | H04W 4/80 |
| | | | | 726/7 |
| 9,325,659 | B2 * | 4/2016 | Ling | H04L 51/32 |
| 2008/0318655 | A1 * | 12/2008 | Davies | G07F 17/32 |
| | | | | 463/16 |
| 2010/0280904 | A1 * | 11/2010 | Ahuja | G06Q 30/02 |
| | | | | 705/14.58 |
| 2011/0250971 | A1 * | 10/2011 | van Os | A63F 13/795 |
| | | | | 463/42 |
| 2012/0211557 | A1 * | 8/2012 | Harris | G06Q 10/107 |
| | | | | 235/375 |
| 2012/0246301 | A1 * | 9/2012 | Vyrros | H04L 45/745 |
| | | | | 709/224 |

(Continued)

FOREIGN PATENT DOCUMENTS

| CA | 2863997 A1 * | 8/2013 | ............ H04L 51/32 |
| JP | 2006-334386 | 12/2006 | |

*Primary Examiner* — Seng H Lim
(74) *Attorney, Agent, or Firm* — Nixon & Vanderhye, P.C.

(57) ABSTRACT

In an exemplary game device, a requesting unit requests establishment of a friendship using one of plural methods, the friendship being a relationship established based on a mutual agreement between users. A display control unit causes a display unit to display one of a request method by which establishment of the friendship has been requested by the requesting unit, and an establishing method by which the friendship has been established.

20 Claims, 11 Drawing Sheets

(56) References Cited

U.S. PATENT DOCUMENTS

| | | | | |
|---|---|---|---|---|
| 2012/0278410 A1* | 11/2012 | Chung | ............... | H04W 4/023 |
| | | | | 709/206 |
| 2012/0309510 A1* | 12/2012 | Taylor | ............... | G06Q 30/02 |
| | | | | 463/29 |
| 2012/0309539 A1* | 12/2012 | Smith | ............... | A63F 13/795 |
| | | | | 463/42 |
| 2012/0310956 A1* | 12/2012 | Huhn | ............... | G06Q 30/0269 |
| | | | | 707/754 |
| 2012/0311504 A1* | 12/2012 | van Os | ............... | G06F 3/0482 |
| | | | | 715/853 |
| 2012/0322560 A1* | 12/2012 | Joo | ............... | A63F 13/35 |
| | | | | 463/42 |
| 2014/0158760 A1* | 6/2014 | Seker | ............... | G06F 17/30943 |
| | | | | 235/380 |
| 2014/0351338 A1* | 11/2014 | Kaneoka | ............... | H04L 51/32 |
| | | | | 709/204 |
| 2015/0246282 A1 | 9/2015 | Sasaki et al. | | |
| 2016/0044087 A1* | 2/2016 | Velummylum | ............... | H04L 67/08 |
| | | | | 726/4 |
| 2017/0061733 A1* | 3/2017 | Gulla | ............... | G07F 17/3244 |
| 2017/0201477 A1* | 7/2017 | Hou | ............... | G06Q 50/01 |
| 2017/0266564 A1* | 9/2017 | Choudhuri | ............... | A63F 13/795 |
| 2017/0266565 A1* | 9/2017 | Choudhuri | ............... | A63F 13/795 |
| 2017/0302611 A1* | 10/2017 | Mizuki | ............... | H04L 51/32 |
| 2017/0319967 A1* | 11/2017 | Chandrasekaran | ... | A63F 13/795 |
| 2018/0193753 A1* | 7/2018 | Kiwada | ............... | A63F 13/35 |

* cited by examiner

| GAME ID | PLAY DATE AND TIME |
|---|---|
| G001 | 2016/12/01 20:00 |
| G002 | 2016/12/02 21:00 |
| G003 | 2016/12/03 10:00 |
| ⋮ | ⋮ |

121

122

| USER ID | IN-GAME USER NAME | GAME ID | PLAY DATE AND TIME | COMMUNICATION METHOD | IN-GAME USER NAME |
|---|---|---|---|---|---|
| U001 | userGa | G004 | 2016/12/04 13:00 | LOCAL | userGz |
| U002 | userGb | G005 | 2016/12/05 22:00 | INTERNET | userGz |
| U003 | userGc | G006 | 2016/12/06 23:00 | INTERNET | userGz |
| ⋮ | ⋮ | ⋮ | ⋮ | ⋮ | ⋮ |

| USER ID | USE NAME | USE IMAGE | FRIEND CODE | COMMUNICATION ADDRESS |
|---|---|---|---|---|
| 004 | userD | imgUd | 012345678901 | adr4 |
| 005 | userE | imgUe | 123456789012 | adr5 |
| 006 | userF | imgUf | 234567890123 | adr6 |
| ⋮ | ⋮ | ⋮ | ⋮ | ⋮ |

*FIG. 6*

| REQUEST SENDER | | REQUEST RECEIVER | | REQUEST DATE AND TIME | CHANNEL TYPE | GAME ID |
|---|---|---|---|---|---|---|
| USER ID | IN-GAME USER NAME | USER ID | IN-GAME USER NAME | | | |
| U007 | — | U010 | — | 2016/12/07 19:00 | LOCAL COMMUNICATION | — |
| U008 | userGd | U011 | userGe | 2016/12/08 8:00 | MULTI-PLAY | G007 |
| U009 | — | U012 | — | 2016/12/09 12:00 | FRIEND CODE | — |
| ⋮ | ⋮ | ⋮ | ⋮ | ⋮ | ⋮ | ⋮ |

*FIG. 7*

| USER ID | ESTABLISHMENT DATE AND TIME | CHANNEL TYPE | GAME ID | IN-GAME USER NAME |
|---|---|---|---|---|
| U013 | 2016/12/13 20:00 | FRIEND CODE | — | — |
| U014 | 2016/12/11 13:00 | LOCAL COMMUNICATION | — | — |
| U015 | 2016/12/15 18:00 | MULTI-PLAY | G008 | userGh |
| ⋮ | ⋮ | ⋮ | ⋮ | ⋮ |

*FIG. 8*

| GAME ID | PLAY DATE AND TIME |
|---|---|
| G009 | 2016/12/16 22:00 |
| G010 | 2016/12/17 11:00 |
| G011 | 2016/12/18 15:00 |
| ⋮ | ⋮ |

| GAME ID | USER NAME | GAME IMAGE |
|---|---|---|
| G012 | gameA | imgGa |
| G013 | gameB | imgGb |
| G014 | gameC | imgGc |
| ⋮ | ⋮ | ⋮ |

INFORMATION-PROCESSING DEVICE, INFORMATION-PROCESSING SYSTEM, INFORMATION-PROCESSING METHOD, AND STORAGE MEDIUM

CROSS REFERENCE TO RELATED APPLICATIONS

The disclosure of Japanese Patent Application No. 2017-1383, filed on Jan. 6, 2017, is incorporated herein by reference.

FIELD

An exemplary embodiment relates to a technique for requesting establishment of a friendship, which is a relationship established based on a mutual agreement between users.

BACKGROUND AND SUMMARY

There is known in the art a variety of methods for registering other players of game devices in a friend list.

An exemplary embodiment provides an information-processing device including a requesting unit and a display control unit. The requesting unit is configured to request establishment of a friendship using one of plural methods. The friendship is a relationship established based on a mutual agreement between users. The display control unit is configured to cause a display unit to display one of a request method by which establishment of the friendship has been requested by the requesting unit, and an establishing method by which the friendship has been established.

BRIEF DESCRIPTION OF THE DRAWINGS

FIG. 6 is a diagram showing an example of user information DB 221.

FIG. 7 is a diagram showing an example of friend request information DB 222.

FIG. 8 is a diagram showing an example of friend information DB 223.

FIG. 9 is a diagram showing an example of game history DB 224.

FIG. 10 is a diagram showing an example of game information DB 225.

DETAILED DESCRIPTION OF NON-LIMITING EXEMPLARY EMBODIMENTS

1. Embodiment

1-1. Configuration

1-1-1. Configuration of Information-Processing System 1

Figure 1:
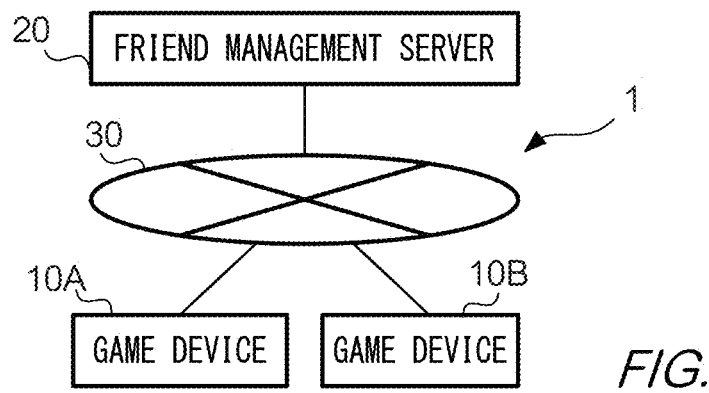
FIG. 1 is a diagram showing an example of a configuration of information-processing system 1.

FIG. 1 is a diagram showing an example of a configuration of information-processing system 1 according to an embodiment. Information-processing system 1 includes game devices 10A and 10B, which will hereinafter be referred to as "game device 10" except where it is necessary to specify otherwise, and friend management server 20. It is of note that game devices 10A and 10B are examples of game device 10; three or more game devices 10 may be included in information-processing system 1. Game devices 10 and friend management server 20 are connected with each other via network 30, which is the Internet.

1-1-2. Configuration of Game Device 10

Figure 2:
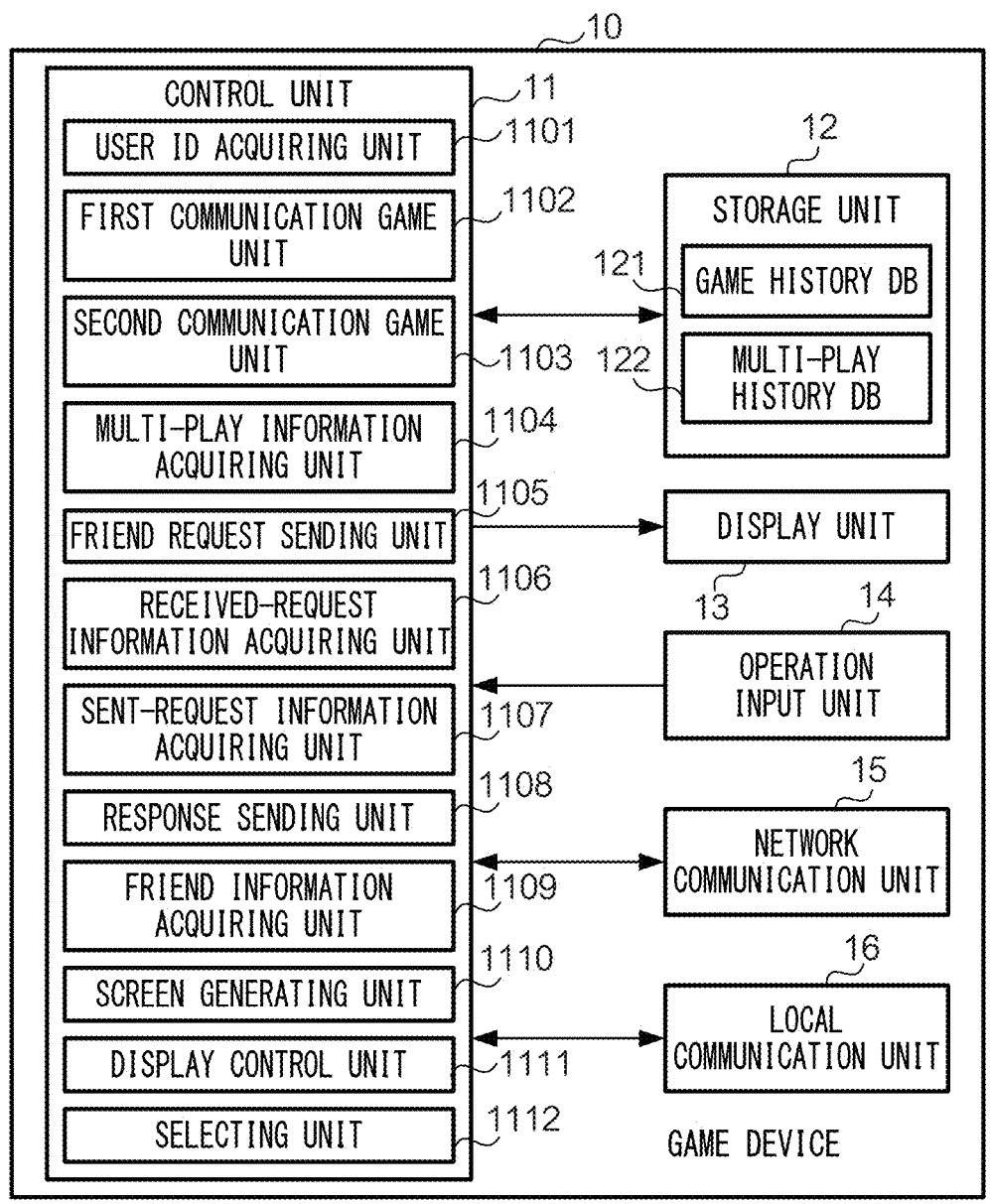
FIG. 2 is a diagram showing an example of a configuration of game device 10.

Game device 10 is an example of an information-processing device, and is, specifically, a portable computer game device. It is of note that in a modification, game device 10 may be a stationary computer game device. FIG. 2 is a diagram showing an example of a configuration of game device 10. Game device 10 includes control unit 11, storage unit 12, display unit 13, operation input unit 14, network communication unit 15, and local communication unit 16. It is of note that in a modification, storage unit 12 may be an external storage medium.

Control unit 11 includes a processor such as a CPU or a GPU, and a volatile memory, which unit executes programs stored in storage unit 12. Functions provided by control unit 11 will be described later.

Storage unit 12 is a storage device such as a flash memory, which unit stores programs to be executed by control unit 11, which programs include a friend registration program for enabling friend registration and a variety of game programs. A friendship herein refers to a relationship established based on a mutual agreement between users. A friendship is established under a condition that a user sends a friend request to another user to request establishment of a friendship, and the other user approves the friend request. It is of note that in a modification, a friendship may be established under a condition that users exchange friend requests.

Methods for requesting establishment of a friendship include a method using local communication, a method using a multi-play function, and a method using a friend code. In the method using local communication, a user causes his/her game device 10 to acquire a user ID of another user from game device 10 of the other user, using local communication, based on which user ID, establishment of a friendship is requested. The local communication performed herein is responsive to a user's input operation, and is dedicated to requesting establishment of a friendship.

In the method using a multi-play function, a user causes his/her game device 10 to acquire a user ID of another user so that the user can play a game with the other user, based on which user ID, establishment of a friendship is requested. Multi-play methods include a method using local communication and a method using Internet communication. Detailed information on multi-play methods is described in, for example, Japanese Unexamined Patent Application Publication No. 26-334386. The method using a multi-play function is, more specifically, divided into a method by which establishment of a friendship is requested during a game play, and a method by which establishment of a friendship is requested after a game play based on a game play history. The latter method will be described later.

In the method using a friend code, a user inputs a friend code of another user in his/her game device 10, based on which friend code establishment of a friendship is requested.

Users who have become friends are able to share information with each other. For example, among users who have become friends using a social networking service (SNS) application, a user can automatically acquire a message posted by another user, or know whether the other user is logged in. Also, users who have become friends are able to enjoy a game simultaneously. For example, the users are able to enjoy battle play or collaborative play together, or to be listed with an identical, joint ranking.

A game herein refers to a computer game such as an action game, a role playing game, or a puzzle game. A game includes a single player game that is played online or offline, and a multi-player game that is played using local communication or Internet communication. It is of note that a game includes an application for learning.

Storage unit 12 also stores identification information of a user of game device 10, which information includes, specifically, a user ID, a user name, a user image, and a friend code. The user ID is identification information uniquely assigned to the user in information-processing system 1, which information is, for example, an alphanumeric identification number. The user name is a character string representing a user's name such as a nickname, which character string is set by the user for general use in information-processing system 1. The user image is an image showing an appearance of the user, such as an avatar, which image is set by the user for general use in information-processing system 1. The friend code is identification information such as a twelve-digit identification number, uniquely assigned to the user information-processing system 1, which identification information is different from the user ID. The friend code is used only for friend registration.

Figures 3, 4, 5:
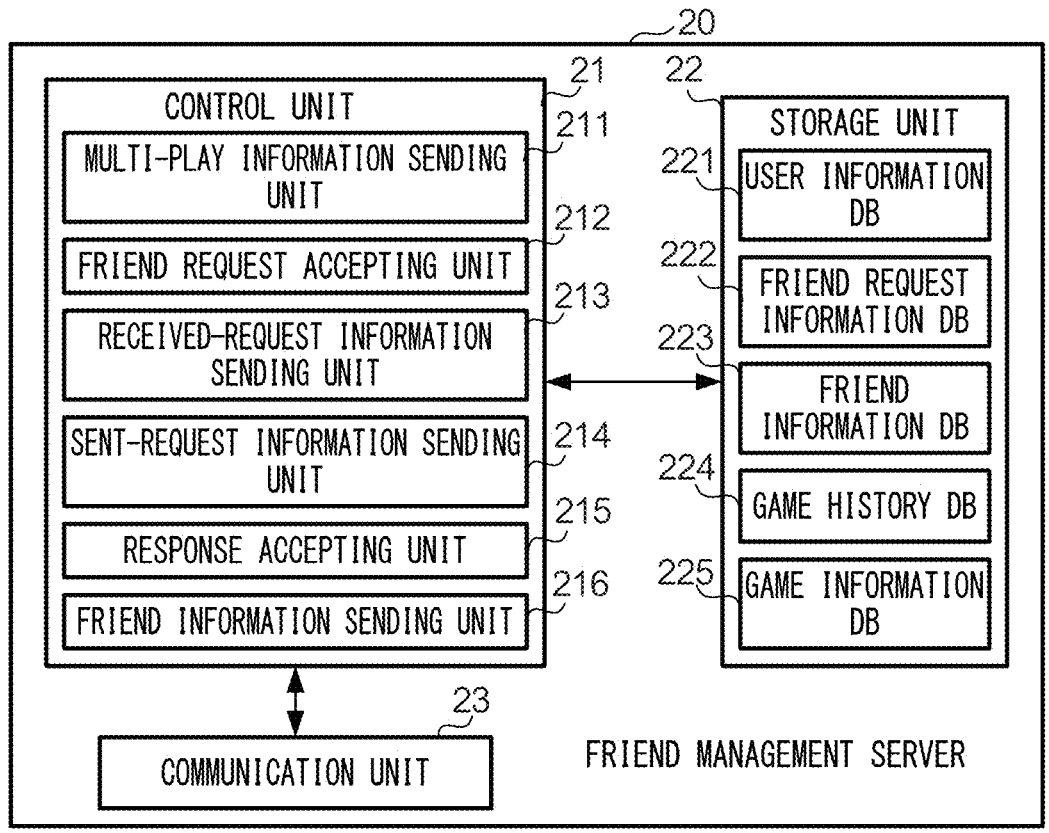
FIG. 3 is a diagram showing an example of game history DB 121.
FIG. 4 is a diagram showing an example of multi-play history DB 122.
FIG. 5 is a diagram showing an example of a configuration of friend management server 20.

Storage unit 12 also stores game history database (DB) 121 and multi-play history DB 122. FIG. 3 is a diagram showing an example of game history DB 121, which is a database for recording a history of games that the user of game device 10 has played using the game device. Any type of game, whether a multi-player game or a single player game, or whether an online play game or an offline play game, may be recorded in game history DB 121. Game history DB 121 records a game ID (ApplicationID), which is identification information of a game, and a play date and time in association with each other. Game history data recorded in game history DB 121 is uploaded to friend management server 20, together with the user ID, at a predetermined timing such as at the start of connection to friend management server 20, so that the uploaded data is recorded in game history DB 224 (described later).

FIG. 4 is a diagram showing an example of multi-play history DB 122, which is a database for recording a history of multi-play sessions that the user of game device 10 has performed together with a user(s) of one or more game devices 10. Any type of multi-play session, regardless of a communication method (a local multi-play session or an Internet multi-play session), may be recorded in multi-play history DB 122. Multi-play history DB 122 records a user ID and an in-game user name of another user, a game ID, a play date and time, a communication method, and an in-game user name of the user in association with each other. An in-game user name herein refers to a character string representing a user's name such as a nickname, which character string is set by the user for use in a particular game. An in-game user name may or may not be identical to a user name generally used in information-processing system 1. It is of note that in a modification, an in-game user name may be replaced with an in-game user image as identification information for use in a particular game. Information on a multi-play session is recorded in multi-play history DB 122, each time a multi-play session is performed. When a multi-play session with an identical user is performed plural times, information on the latest multi-play session is retained in multi-play history DB 122.

Now, display unit 13 is a display device such as a liquid crystal display or an organic electroluminescence (EL) display.

Operation input unit 14 is an input device such as a touch sensor placed on top of display unit 13, an arrow key, or an analog stick.

Network communication unit 15 is a communication module for performing Internet communication with another game device 10 or friend management server 20, which Internet communication is a communication method using TCP/IP as a communication protocol. Specifically, network communication unit 15 connects to a wireless LAN access point according to, for example, IEEE802.11.b/g, thereby communicating with another game device 10 or friend management server 20 via network 30.

Local communication unit 16 is a communication module for performing local communication with another game device 10, which local communication is a communication method using near-field communication technology. The near field communication technology includes Bluetooth (registered trademark), ZigBee (registered trademark), Wibree (registered trademark), ultra-wideband (UWB), near-field communication (NFC), or infrared communication. A communication distance of local communication unit 16 ranges from a few centimeters to a few dozen meters, which is shorter than that of network communication unit 15.

Control unit 11, by executing a friend registration program stored in storage unit 12, provides functions of user ID acquiring unit 1101, first communication game unit 1102, second communication game unit 1103, multi-play information acquiring unit 1104, friend request sending unit 1105, received-request information acquiring unit 1106, sent-request information acquiring unit 1107, response sending unit 1108, friend information acquiring unit 1109, screen generating unit 1110, display control unit 1111, and selecting unit 1112.

User ID acquiring unit 1101, in response to a user's input operation, acquires identification information of another user from another game device 10 via local communication unit 16. Specifically, user ID acquiring unit 1101 acquires a user ID to enable requesting of establishment of a friendship using local communication.

First communication game unit 1102 enables the user to play a game with another user via local communication unit 16. When enabling the user to play a game with another user, first communication game unit 1102 acquires identification information of the other user from game device 10 of the other user, which information includes, specifically, a user ID, a user name, a user image, and an in-game user name. Among the acquired items of information, the user ID and the in-game user name are recorded in multi-play history DB 122.

Second communication game unit 1103 enables the user to play a game with another user via network communication unit 15. When enabling the user to play a game with another user, second communication game unit 1103 acquires identification information of the other user from game device 10 of the other user, which information includes, specifically, a user ID, a user name, a user image, and an in-game user name. Among the acquired items of information, the user ID and the in-game user name are recorded in multi-play history DB 122.

Multi-play information acquiring unit 1104, in response to a user's input operation to cause a multi-play history list screen to be displayed, sends a multi-play information request to friend management server 20. The multi-play history list screen is a list screen showing information on another user with whom the user has played using first communication game unit 1102, and information on another user with whom the user has played using second communication game unit 1103. The multi-play information request sent by multi-play information acquiring unit 1104 includes user IDs and game IDs recorded in multi-play history DB 122. After sending the multi-play information request, multi-play information acquiring unit 1104 acquires multi-play information sent from friend management server 20.

Friend request sending unit 1105, according to a user's input operation, generates a friend request using one of a number of different methods to send the friend request to friend management server 20. Specifically, in a case where establishment of a friendship is requested using local communication, friend request sending unit 1105 generates a friend request including a user ID of another user acquired by user ID acquiring unit 1101, and a user ID of the user of game device 10. In a case where establishment of a friendship is requested using a multi-play function, friend request sending unit 1105 generates a friend request including a user ID of the user of game device 10, and a user ID, a game ID, and an in-game user name of another user, which are acquired from multi-play history DB 122. In a case where establishment of a friendship is requested using a friend code, friend request sending unit 1105 acquires a user ID corresponding to a friend code of another user input by the user using operation input unit 14, from user information DB 221 of friend management server 20, and generates a friend request including the acquired user ID and a user ID of the user of game device 10. Friend request sending unit 1105 is an example of a requesting unit.

Received-request information acquiring unit 1106, in response to a user's input operation to cause a received-request list screen to be displayed, sends a received-request information request to friend management server 20. The received-request list screen is a list screen showing friend requests that have been sent to the user by other users. After sending the received-request information request, received-request information acquiring unit 1106 receives received-request information sent from friend management server 20.

Sent-request information acquiring unit 1107, in response to a user's input operation to cause a sent-request list screen to be displayed, sends a sent-request information request to friend management server 20. The sent-request list screen is a list screen showing friend requests that have been sent by the user to other users. After sending the sent-request information request, sent-request information acquiring unit 1107 receives sent-request information sent from friend management server 20.

Response sending unit 1108, according to a user's input operation, sends a response to a friend request to friend management server 20.

Friend information acquiring unit 1109, in response to a user's input operation to cause a friend list screen to be displayed, sends a friend information request to friend management server 20 to acquire friend information from the server.

Screen generating unit 1110, according to a user's input operation, generates a multi-play history list screen (see FIG. 13) and a detailed screen (see FIG. 14) by referring to multi-play history DB 122. Also, screen generating unit 1110 generates a received-request list screen (see FIG. 17) and a detailed screen (see FIG. 18) based on received-request information acquired by received-request information acquiring unit 1106. In addition, screen generating unit 1110 generates a sent-request list screen (see FIG. 15) and a detailed screen (see FIG. 16) based on sent-request information acquired by sent-request information acquiring unit 1107. Further, screen generating unit 1110 generates a friend list screen (see FIG. 19) and a detailed screen (see FIG. 20) based on friend information acquired by friend information acquiring unit 1109.

Display control unit 1111 causes display unit 13 to display a screen generated by screen generating unit 1110.

Selecting unit 1112, in a multi-play history list screen displayed on display unit 13 by display control unit 1111, selects information on another user according to a user's input operation.

1-1-3. Configuration of Friend Management Server 20

Friend management server 20 is an information-processing device for registering friends of users of game devices 10. FIG. 5 is a diagram showing an example of a configuration of friend management server 20. Friend management server 20 includes control unit 21, storage unit 22, and communication unit 23. It is of note that in a modification, storage unit 22 may be an external storage device.

Control unit 21 includes a processor such as a CPU or a GPU, and a volatile memory, and executes programs stored in storage unit 22. Functions provided by control unit 21 will be described later.

Storage unit 22 is a storage device such as a hard disk, which unit stores programs to be executed by control unit 21, which programs include a friend registration program for enabling friend registration.

In addition, storage unit 22 stores user information DB 221, friend request information DB 222, friend information DB 223, game history DB 224, and game information DB 225.

FIG. 6 is a diagram showing an example of user information DB 221, which is a database for managing information on users of game devices 10. User information DB 221 records a user ID, a user name, a user image, a friend code, and a communication address in association with each other.

FIG. 7 is a diagram showing an example of friend request information DB 222, which is a database for recording information on friend requests that have been sent from users of game device 10 to other users. Friend request information DB 222, in other words, functions as an in-and-out tray for friend requests. Friend request information DB 222 records a user ID and an in-game user name of a sender of a friend request, a user ID and an in-game user name of a receiver of the friend request, a request date and time, a channel type, and a game ID in association with each other. The channel type is information indicative of a method or channel, by use of which establishment of a friendship is requested. Methods for requesting establishment of a friendship include, specifically, a method using location communication, a method using a multi-play function, and a method using a friend code, as described above.

FIG. 8 is a diagram showing an example of friend information DB 223, which is a database for recording information on friends for users of game devices 10. Friend information DB 223 is, in other words, a collection of friend lists. Friend information DB 223 records, for each of users of game devices 10, a user ID of another user (friend), a date and time when the friendship was established, a channel type, a game ID, and an in-game user name of a sender or receiver of a friend request in association with each other. It is of note that in a modification, friend information DB 223 may record information indicating which user is a sender and which user is a receiver of a friend request.

FIG. 9 is a diagram showing an example of game history DB 224, which is a database for recording, for each of users of game devices 10, a history of games that a user has played using his/her game device 10. Any type of game, whether a multi-player game or a single player game, or whether an online play game or an offline play game, may be recorded in game history DB 224. Game history DB 224 records, for each of users of game devices 10, a game ID and a play date and time in association with each other. Game history data recorded in game history DB 224 is uploaded from each of game devices 10 to friend management server 20 at a predetermined timing.

FIG. 10 is a diagram showing an example of game information DB 225, which is a database for managing identification information of games. Game information DB 225 records a game ID, a game name, and a game image in association with each other. The game image herein refers to, for example, an icon representing a game.

Now, communication unit 23 is a communication module for performing Internet communication with game device 10 via network 30.

Control unit 21, by executing a friend registration program stored in storage unit 22, provides functions of multi-play information sending unit 211, friend request accepting unit 212, received-request information sending unit 213, sent-request information sending unit 214, response accepting unit 215, and friend information sending unit 216.

Multi-play information sending unit 211, on receiving multi-play information request from game device 10, generates multi-play information by referring to user information DB 221, game history DB 224, and game information DB 225. Specifically, multi-play information sending unit 211, by referring to user information DB 221, acquires user names and user images corresponding to user IDs included in a multi-play information request; by referring to game history DB 224, acquires game histories (specifically, sets of a game ID and a play date and time) corresponding to the user IDs; by referring to game information DB 225, acquires game names and game images corresponding to game IDs included in the multi-play information request and to the game IDs acquired from game history DB 224; and sends the acquired items of information to game device 10 as multi-play information.

Friend request accepting unit 212, on receiving a friend request from game device 10, registers information on the received friend request in friend request information DB 222.

Received-request information sending unit 213, on receiving a received-request information request from game device 10, generates received-request information on friend requests that have been sent to a user of the game device, by referring to friend request information DB 222. When doing so, received-request information sending unit 213 adds user names and user images of senders of a friend request to the received-request information, by referring to user information DB 221. Also, received-request information sending unit 213 adds game histories (specifically, sets of a game ID and a play date and time) for the senders to the received-request information, by referring to game history DB 224. In addition, received-request information sending unit 213 adds game names and game images corresponding to the game IDs acquired from game history DB 224 to the received-request information, by referring to game information DB 225. After generating the received-request information, received-request information sending unit 213 sends the generated received-request information to game device 10.

Sent-request information sending unit 214, on receiving a sent-request information request from game device 10, generates sent-request information on friend requests that have been sent by a user of the game device, by referring to friend request information DB 222. When doing so, sent-request information sending unit 214 adds user names and user images of receivers of a friend request to the sent-request information, by referring to user information DB 221. Also, sent-request information sending unit 214 adds game histories (specifically, sets of a game ID and a play date and time) for the receivers to the sent-request information, by referring to game history DB 224. In addition, sent-request information sending unit 214 adds game names and game images corresponding to the game IDs acquired from game history DB 224 to the sent-request information, by referring to game information DB 225. After generating the sent-request information, sent-request information sending unit 214 sends the generated sent-request information to game device 10.

Response accepting unit 215 accepts a response to a friend request from game device 10. On receiving a response indicative of an intention to approve a friend request, response accepting unit 215 registers a sender and a receiver of the friend request as friends. Specifically, response accepting unit 215, by referring to friend request information DB 222, registers identification information of the sender and a request method (in other words, a friendship establishing method) in friend information DB 223 in association with a user ID of the receiver. Also, response accepting unit 215, by referring to friend request information DB 222, registers identification information of the receiver and a request method (in other words, a friendship establishing method) in friend information DB 223 in association with a user ID of the sender. On the other hand, on receiving a response indicative of an intention to reject a friend request, response accepting unit 215 deletes information on the friend request from friend request information DB 222.

Friend information sending unit 216, on receiving a friend information request from game device 10, generates friend information for a user of the game device by referring to friend information DB 223. When doing so, friend information sending unit 216 adds user names and user images of friends to the friend information by referring to user information DB 221. Also, friend information sending unit 216 adds game histories (specifically, sets of a game ID and a play date and time) of the friends to the friend information by referring to game history DB 224. In addition, friend information sending unit 216 adds game names and game images corresponding to the game IDs acquired from game history DB 224 to the friend information, by referring to game information DB 225. After generating the friend information, friend information sending unit 216 sends the generated friend information to game device 10.

1-2. Operation

Figure 11:
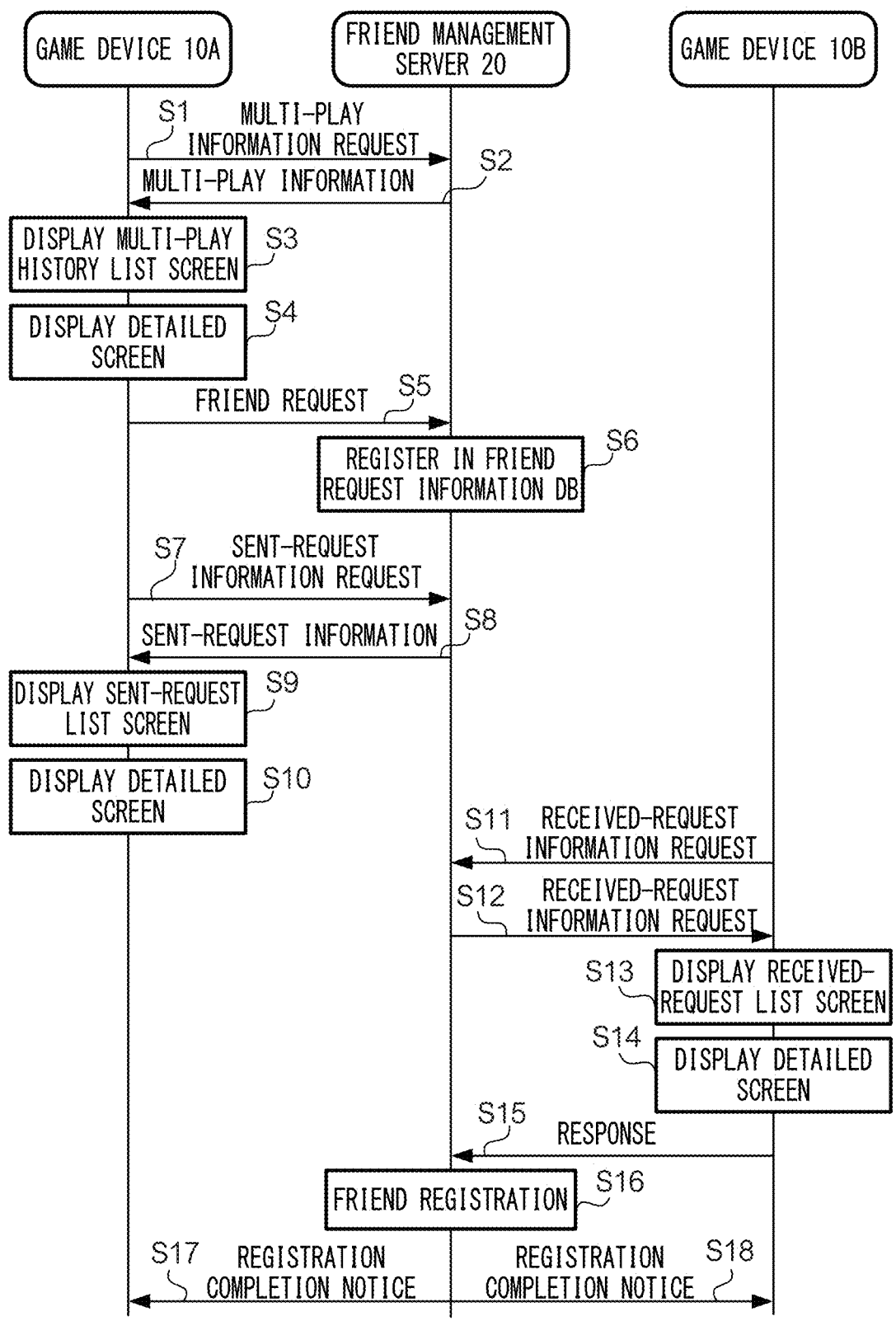
FIG. 11 is a sequence diagram showing an example of an operation for registering a friend.
Figure 12:
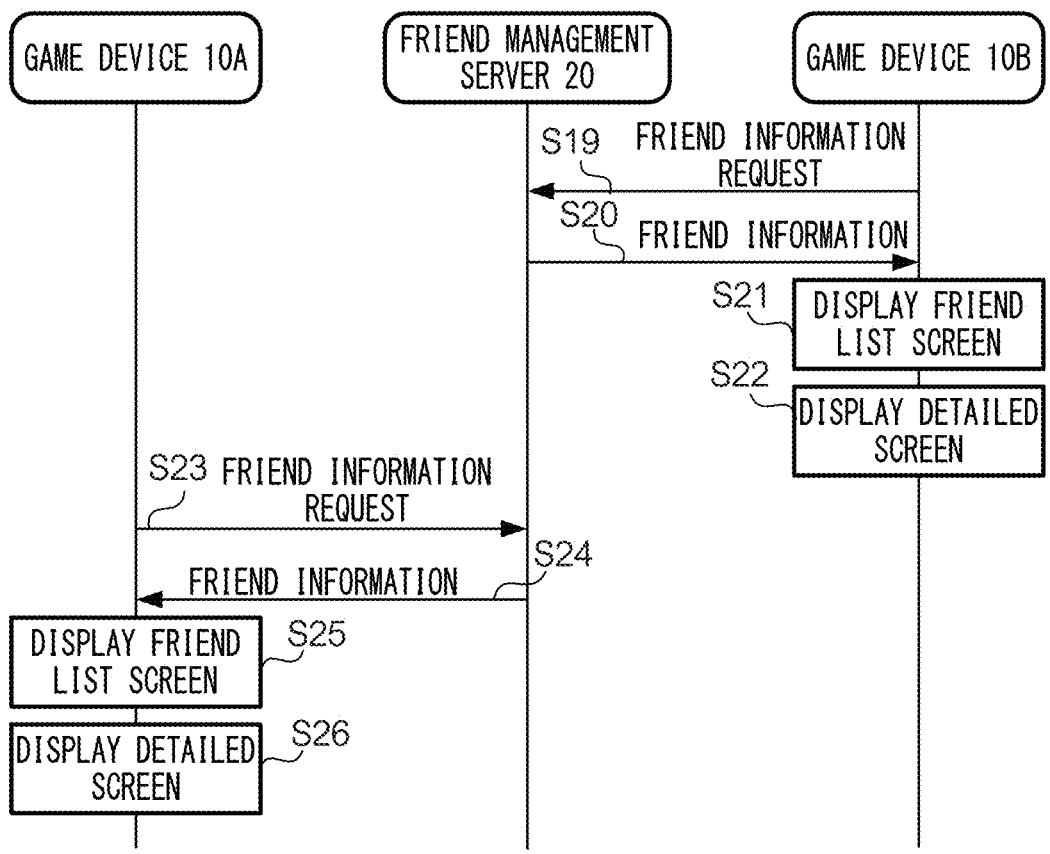
FIG. 12 is a sequence diagram showing an example of an operation for registering a friend.

An operation carried out in information-processing system 1 to register a friend will be described. Specifically, as an example, an operation to register a friend using a multi-play history will be described, which operation is based on an assumption that that user A of game device 10A sends a friend request to user B of game device 10B. FIGS. 11 and 12 are sequence diagrams showing an example of the present operation.

When user A of game device 10A performs an input operation using operation input unit 14 to cause a multi-play history list screen to be displayed, multi-play information acquiring unit 1104 of the game device sends a multi-play information request to friend management server 20 (step S1). On accepting the multi-play information request, multi-play information sending unit 211 of friend management server 20 generates multi-play information by referring to user information DB 221, game history DB 224, and game information DB 225 to send the generated multi-play information to game device 10A (step S2).

Figure 13:
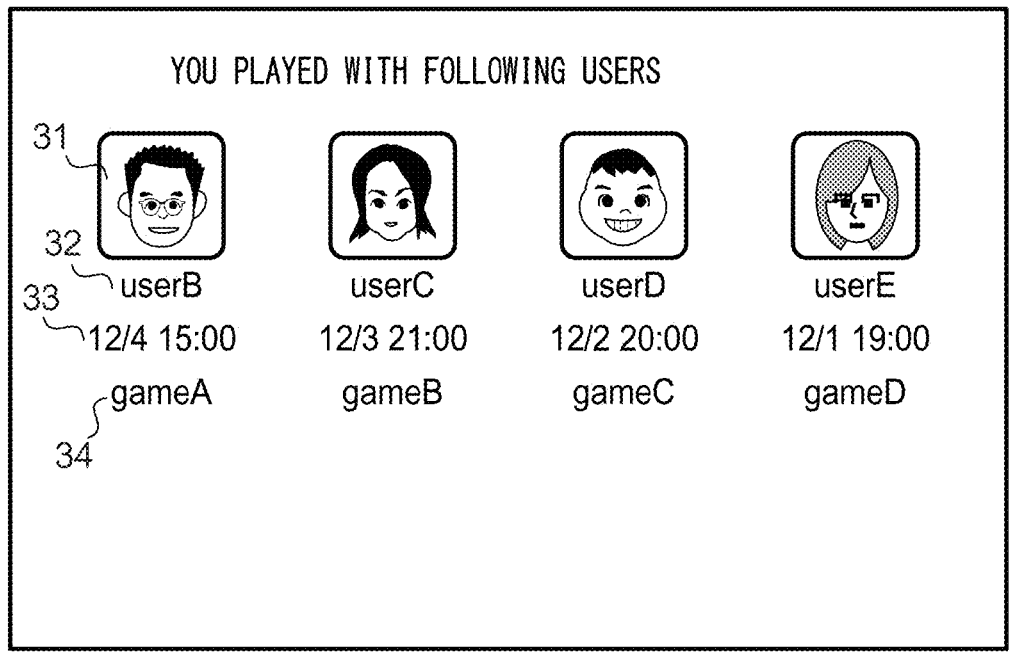
FIG. 13 is a diagram showing an example of multi-play history list screen.

When the multi-play information is acquired by multi-play information acquiring unit 1104 of game device 10A, screen generating unit 1110 of the game device generates a multi-play history list screen by referring to the acquired multi-play information and multi-play history DB 122. After the multi-play history list screen is generated, display control unit 1111 causes display unit 13 to display the generated screen (step S3). FIG. 13 is a diagram showing an example of the multi-play history list screen.

The multi-play history list screen is a screen capable of showing identification information of other users with which user A of game device 10A has played a game using near field communication, and identification information of other users with which user A has played a game using Internet communication. The screen is displayed to enable user A to send a friend request to another user with whom user A has played a game. Also, the screen is displayed to enable user A to prevent establishment of a friendship with another user with whom user A has played a game, and to cancel an established friendship.

In the multi-play history list screen, items of identification information of other users are arranged on a play date and time basis in chronological order, regardless of a communication method (local communication or Internet communication) used for a multi-play session. In the example screen shown in FIG. 13, identification information of another user with whom the user has played recently is shown at the upper left side. Each of the items of identification information of other users includes user image 31 and user name 32, in association with which identification information, play date and time 33 and game name 34 are shown.

Figure 14:
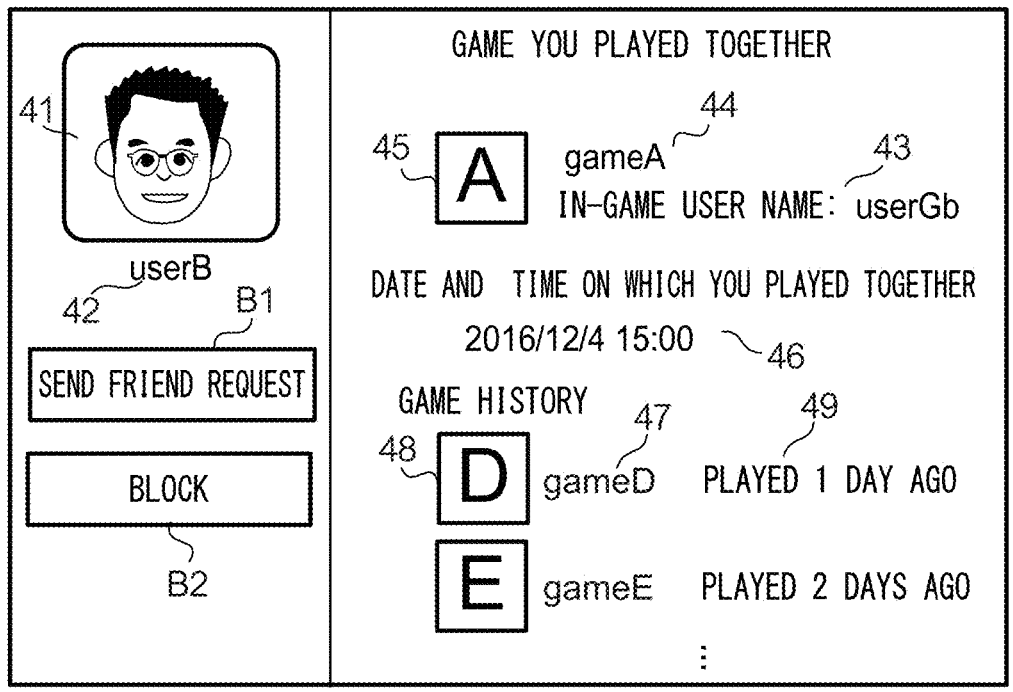
FIG. 14 is a diagram showing an example of a screen displaying details of another user with whom a user previously played a game.

When user A, in the multi-play history list screen, performs an input operation using operation input unit 14, in response to which selecting unit 1112 selects user image 31 of user B, screen generating unit 1110 generates a detailed screen of user B by referring to the multi-play information acquired at step S2 and multi-play history DB 122. After the detailed screen is generated, display control unit 1111 causes display unit 13 to display the generated screen (step S4). FIG. 14 is a diagram showing an example of the detailed screen of user B.

The detailed screen of user B includes identification information of user B, identification information and play date and time 46 of a game that user A has played with user B, a game history of user B, friend request button B1, and block button B2. The identification information of user B includes user image 41, user name 42, and in-game user name 43 of user B. The identification information of a game that user A has played with user B includes game name 44 and game image 45. The game history of user B includes one or more sets of game name 47, game image 48, and play date and time 49, in which game history, items of information on a game are arranged on a play date and time basis in chronological order. In the example screen shown in FIG. 14, information on a game played recently is shown at the top. When user A, in the detailed screen, selects block button B2 using operation input unit 14, a user ID of user B is registered in a block list (not shown) so that an oncoming friend request from user B is not displayed on display unit 13. On the other hand, when user A selects friend request button B1, friend request sending unit 1105 of game device 10A generates a friend request by referring to multi-play history DB 122, in which friend request a user ID and an in-game user name of user A, who is a sender of the request, a user ID and an in-game user name of user B, who is a receiver of the request, a channel type, and a game ID are specified. In the present example operation, a channel type "multi-play" is specified. After generating the friend request, friend request sending unit 1105 sends the generated friend request to friend management server 20 (step S5).

It is of note that in a modification, the detailed screen of user B may include a button for requesting a multi-play session (rematch) with user B, selection of which button causes first communication game unit 1102 or second communication game unit 1103 to enable user A to play a game with user B. In such a case, the multi-play history list screen is displayed to enable user A to play a game with user B.

When the friend request sent from game device 10A is accepted by friend request accepting unit 212 of friend management server 20, the friend request accepting unit registers information on the accepted friend request in friend request information DB 222 (step S6). Specifically, friend request accepting unit 212 records, in friend request information DB 222, the user ID and the in-game user name of user A, who is the sender of the friend request, the user ID and the in-game user name of user B, who is the receiver of the friend request, a date and time of acceptance (request date and time), the channel type, and the game ID.

After step S6, when user A of game device 10A, who is the sender of the friend request, performs an input operation using operation input unit 14 to cause a sent-request list screen to be displayed, sent-request information acquiring unit 1107 of the game device sends a sent-request information request to friend management server 20 (step S7). On receiving the sent-request information request, sent-request information sending unit 214 of friend management server 20 generates sent-request information by referring to friend request information DB 222, user information DB 221, game history DB 224, and game information DB 225 to send the generated sent-request information to game device 10A (step S8).

Figure 15:
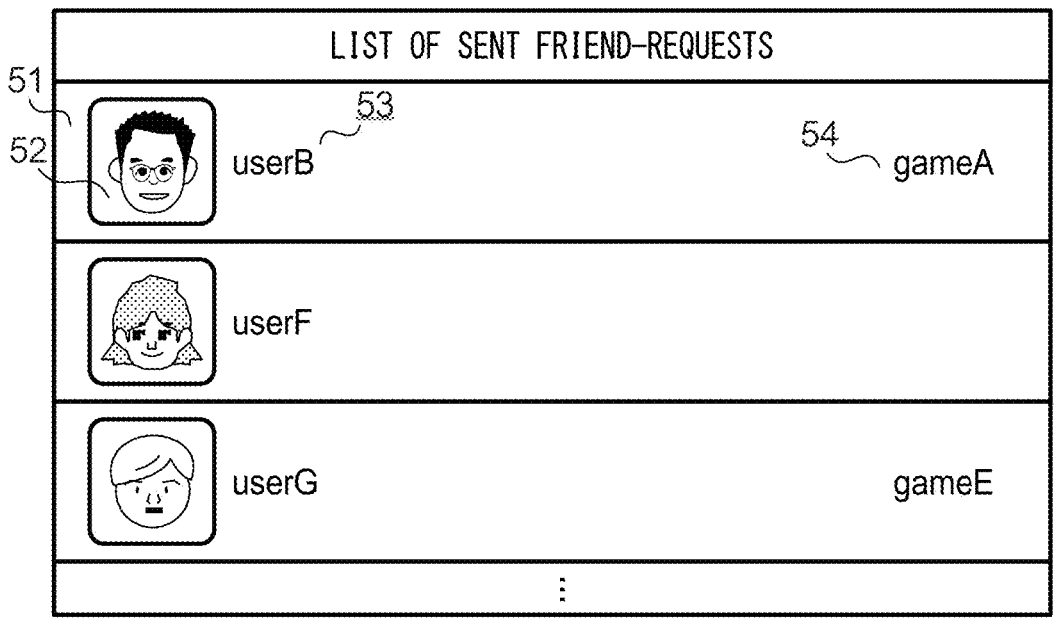
FIG. 15 is a diagram showing an example of a sent-request list screen.

When the sent-request information is acquired by sent-request information acquiring unit 1107 of game device 10A, screen generating unit 1110 of the game device generates a sent-request list screen based on the acquired sent-request information. After the sent-request list screen is generated, display control unit 1111 causes display unit 13 to display the generated screen (step S9). FIG. 15 is a diagram showing an example of the sent-request list screen.

The sent-request list screen is a screen showing a list of one or more friend requests which user A has sent to other users, in which list, the friend requests are arranged on a request date and time basis in chronological order. In the example screen shown in FIG. 15, friend requests are arranged such that those having a later request date and time are shown at the top. In display area 51 of each of the friend requests, user image 52 and user name 53 of a receiver of a friend request, and game name 54 indicative of a request method are shown in association with each other. It is of note that in a modification, a game image or an in-game user name of a receiver of a friend request may be shown in addition to or instead of a game name.

Figure 16:
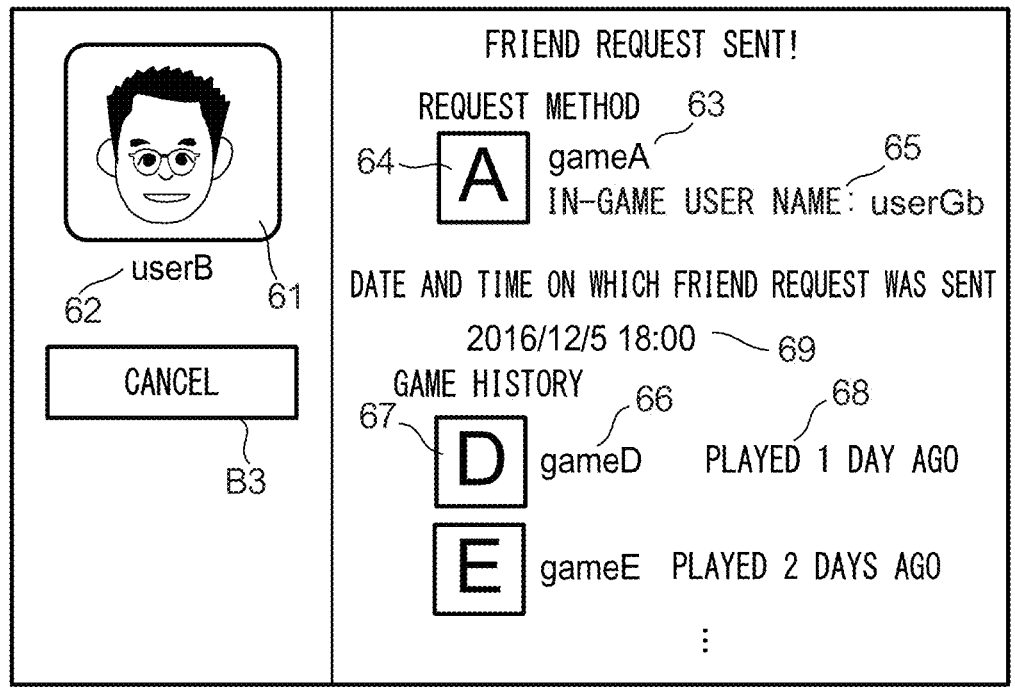
FIG. 16 is a diagram showing an example of a detailed screen for a receiver of a request.

When user A, in the sent-request list screen, selects the friend request sent to user B, using operation input unit 14, screen generating unit 1110 generates a detailed screen of the selected friend request based on the sent-request information acquired from friend management server 20. After the detailed screen is generated, display control unit 1111 causes display unit 13 to display the generated screen (step S10). FIG. 16 is a diagram showing an example of the detailed screen of the friend request sent to user B, which screen can be displayed after user A sends the friend request to user B.

The detailed screen of the friend request is a screen showing identification information of user B, who is the receiver of the friend request, and a request method by which establishment of a friendship with user B has been requested by user A. The identification information of user B includes user image 61 and user name 62 of user B. Information indicative of the request method includes game name 63, game image 64, and in-game user name 65 of user B, display of which items of information indicates that the friend request has been triggered by a multi-play session. The detailed screen of the friend request also includes a history of games played by user B, which history includes one or more sets of game name 66, game image 67, and play date and time 68, which sets of information are arranged on a play date and time basis in chronological order. In the example screen shown in FIG. 16, sets of information are arranged such that those having a later play date and time are shown at the top. The detailed screen of the friend request also includes request date and time 69 and cancel button B3. When user A, in the detailed screen, selects cancel button B3 using operation input unit 14, game device 10A sends a request to cancel the friend request to friend management server 20. On the other hand, when user A performs an input operation to cause the previous screen to be displayed, display control unit 1111 again causes display unit 13 to display the sent-request list screen.

On the other hand, after step S6, when user B of game device 10B, who is the receiver of the friend request, performs an input operation using operation input unit 14 to cause a received-request list screen to be displayed, received-request information acquiring unit 1106 of the game device sends a received-request information request to friend management server 20 (step S11). On receiving the received-request information request, received-request information sending unit 213 of friend management server 20 generates received-request information by referring to friend request information DB 222, user information DB 221, game history DB 224, and game information DB 225 to send the generated received-request information to game device 10B (step S12).

Figure 17:
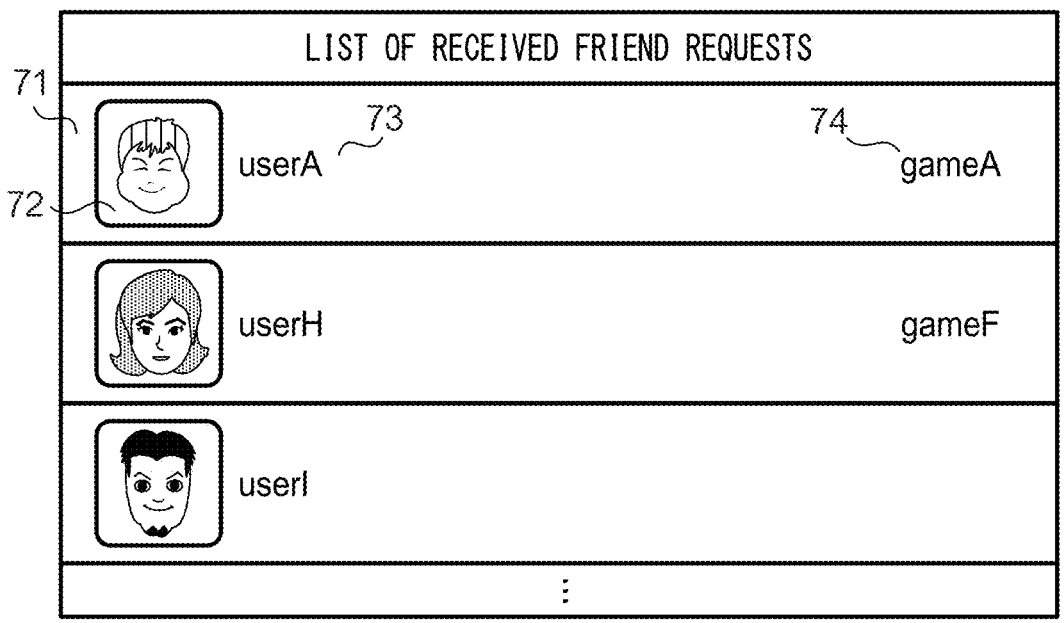
FIG. 17 is a diagram showing an example of a received-request list screen.

When the received-request information is acquired by received-request information acquiring unit 1106 of game device 10B, screen generating unit 1110 of the game device generates a received-request list screen based on the acquired received-request information. After the received-request list screen is generated, display control unit 1111 causes display unit 13 to display the generated screen (step S13). FIG. 17 is a diagram showing an example of the received-request list screen.

The received-request list screen is a screen showing a list of one or more friend requests that user B has received from other users, in which list the friend requests are arranged on a request date and time basis in chronological order. In the example screen shown in FIG. 17, friend requests are arranged such that those having a later request date and time are shown at the top. In display area 71 of each of the friend requests, user image 72 and user name 73 of a sender of a friend request, and game name 74 indicative of a request method are shown in association with each other. It is of note that in a modification, a game image or an in-game user name of a sender of a friend request may be shown in addition to or instead of a game name.

Figure 18:
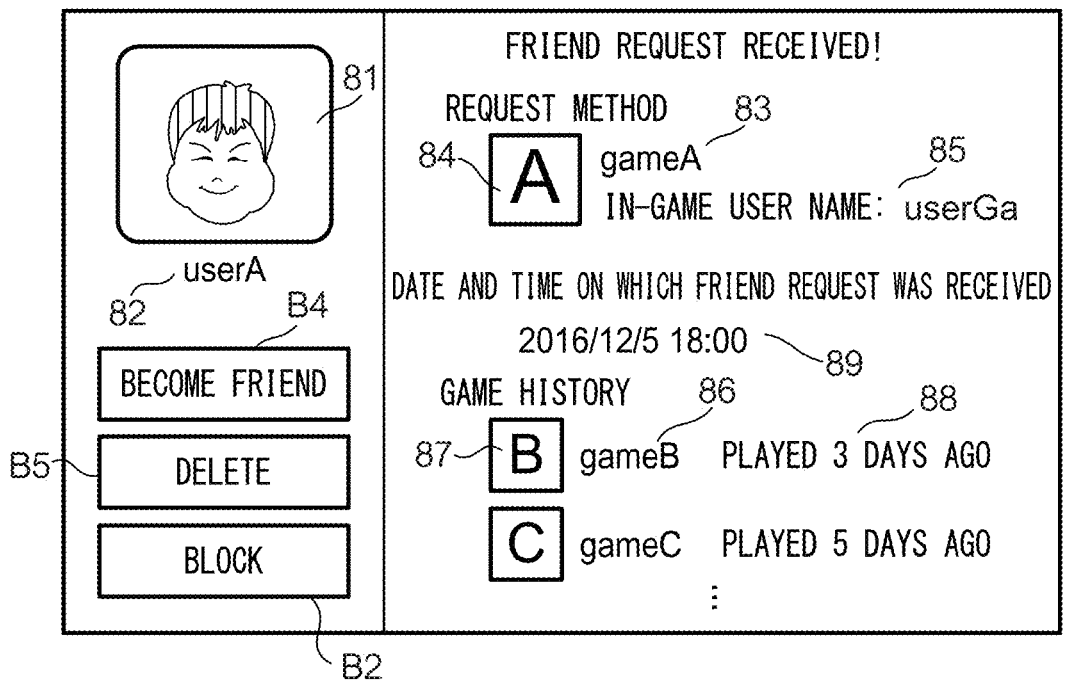
FIG. 18 is a diagram showing an example of a detailed screen for a sender of a request.

When user B, in the received-request list screen, selects the friend request sent from user A, using operation input unit 14, screen generating unit 1110 generates a detailed screen of the selected friend request based on the received-request information acquired from friend management server 20. After the detailed screen is generated, display control unit 1111 causes display unit 13 to display the generated screen (step S14). FIG. 18 is a diagram showing an example of the detailed screen of the friend request sent from user A, which screen can be displayed after user A sends the friend request to user B.

The detailed screen of the friend request is a screen showing identification information of user A, who is the sender of the friend request, and a request method by which establishment of a friendship with user B has been requested by user A. The identification information of user A includes user image 81 and user name 82 of user A. Information indicative of the request method includes game name 83, game image 84, and in-game user name 85 of user A, display of which items of information indicates that the friend request has been triggered by a multi-play session, which information is useful for user B in deciding whether to approve the friend request. The detailed screen of the friend request also includes a history of games played by user A, which is also useful for user B in deciding whether to approve the friend request. The history of games includes one or more sets of game name 86, game image 87, and play date and time 88, which sets of information are arranged on a play date and time basis in chronological order. In the example screen shown in FIG. 18, sets of information are arranged such that those having a later play date and time are shown at the top. The detailed screen of the friend request also includes request date and time 89, request approve button B4, delete button B5, and block button B6. When user B, in the detailed screen, selects delete button B5 using operation input unit 14, response sending unit 1108 of game device 10B sends a response indicative of an intention to reject the friend request from user A to friend management server 20. When user B selects block button B2, a user ID of user A is registered in a block list (not shown) so that an oncoming friend request from user A is not displayed on display unit 13. When user B selects request approve button B4, response sending unit 1108 sends a response indicative of an intention to approve the friend request from user A to friend management server 20 (step S15).

When the response is accepted by response accepting unit 215 of friend management server 20, the response accepting unit registers user A as a friend of user B (step S16). Specifically, response accepting unit 215, by referring to friend request information DB 222, registers identification information of user A and a request method (in other words, friend establishing method) in friend information DB 223 in association with the user ID of user B. More specifically, response accepting unit 215 registers the user ID and the in-game user name of user A, a response-accepted date and time (friend-established date and time), a channel type, and a game ID. Also, response accepting unit 215, by referring to friend request information DB 222, registers identification information of user B and a request method (in other words, friend establishing method) in friend information DB 223 in association with the user ID of user A. Specifically, response accepting unit 215 registers the user ID and the in-game user name of user B, a response-accepted date and time (friendship-established date and time), a channel type, and a game ID. After completing the friend registration, response accepting unit 215 sends a friend registration completion notice to game devices 10A and 10B (steps S17 and S18).

After the friend registration is completed, when user B of game device 10B, who is the receiver of the friend request, performs an input operation using operation input unit 14 to cause a friend list screen to be displayed, friend information acquiring unit 1109 of the game device sends a friend information request to friend management server 20 (step S19). On receiving the friend information request, friend information sending unit 216 of friend management server 20 generates friend information by referring to friend information DB 223, user information DB 221, game history DB 224, and game information DB 225 to send the generated friend information to game device 10B (step S20).

Figure 19:
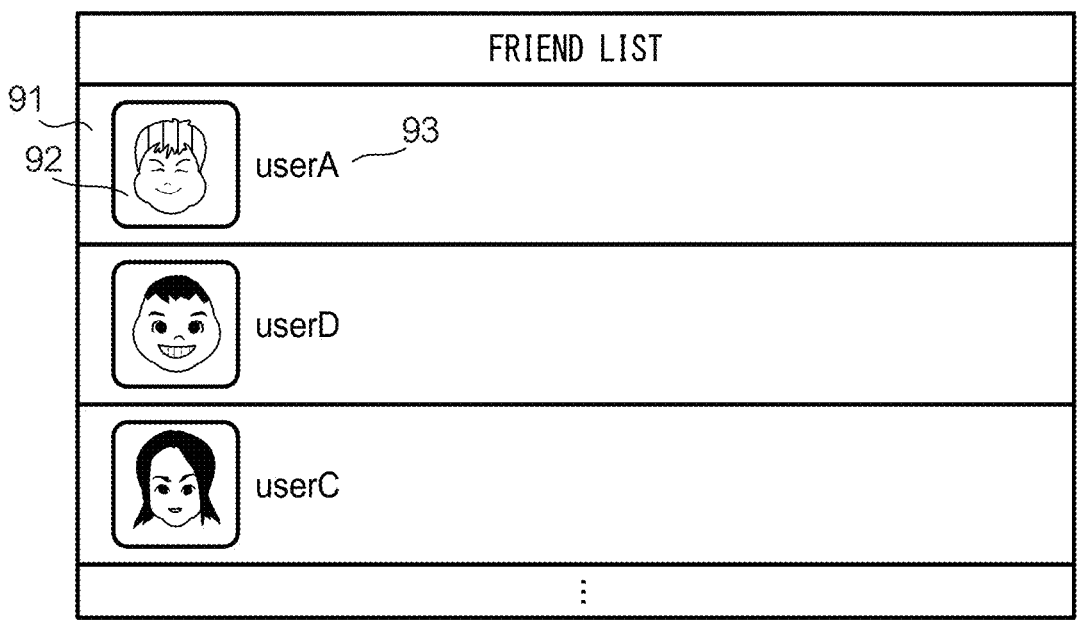
FIG. 19 is a diagram showing an example of a friend list screen.

When the friend information is acquired by friend information acquiring unit 1109 of game device 10B, screen generating unit 1110 of the game device generates a friend list screen based on the acquired friend information. After the friend list screen is generated, display control unit 1111 causes display unit 13 to display the generated screen (step S21). FIG. 19 is a diagram showing an example of the friend list screen.

The friend list screen is a screen showing a list of other users who are friends of user B, in which list the other friends are arranged on a friendship-established date and time basis in chronological order. In the example screen shown in FIG. 19, other users are arranged such that those having a later friendship-established date and time are shown at the top. In display area 91 of each of the other users, user image 92 and user name 93 of another user are shown. It is of note that in a modification, a friendship establishing method may be shown in association with user image 92 and user name 93 of another user. It is also of note that in another modification, online users may be shown above offline users.

Figure 20:
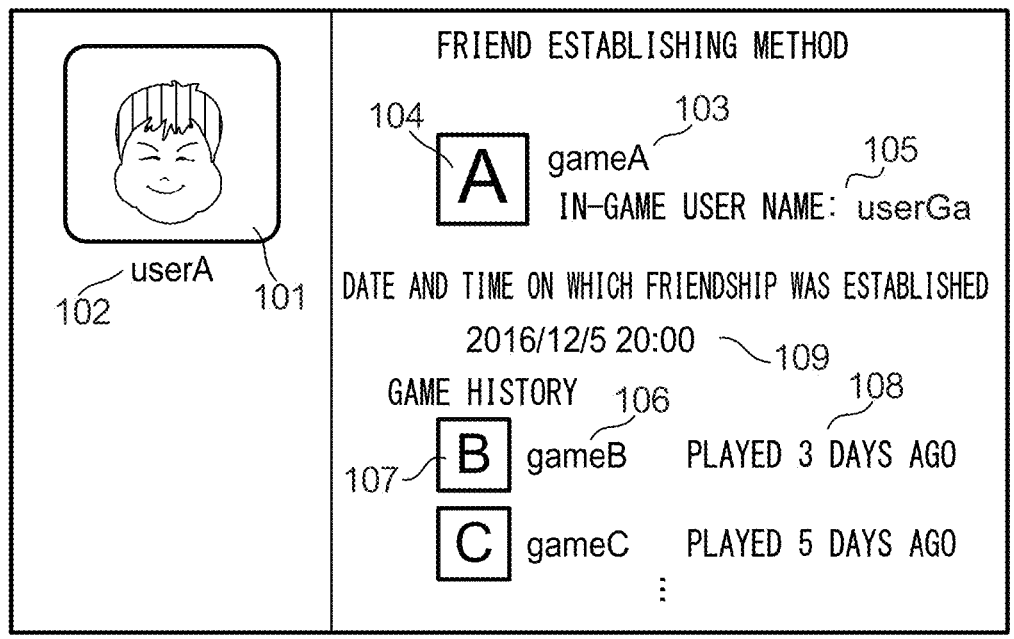
FIG. 20 is a diagram showing an example of a detailed screen for a friend.

When user B, in the friend list screen, selects user A using operation input unit 14, screen generating unit 1110 generates a detailed screen of user A based on the friend information acquired from friend management server 20. After the detailed screen is generated, display control unit 1111 causes display unit 13 to display the generated screen (step S22). FIG. 20 is a diagram showing an example of the detailed screen of user A, which screen can be displayed after user A and user B have established a friendship.

The detailed screen of user A is a screen showing identification information of user A, who is a friend of user B, and a friendship-establishing method by which a friendship has been established between user A and user B, in which screen a friendship-establishing method is shown instead of a request method. The identification information of user A includes user image 101 and user name 102 of user A. Information indicative of the friendship-establishing method includes game name 103, game image 104, and in-game user name 105 of user A, display of which items of information indicates that establishment of a friendship has been triggered by a multi-play session. The detailed screen of user A also includes a history of games played by user A, which history includes one or more sets of game name 106, game image 107, and play date and time 108, which sets of information are arranged on a play date and time basis in chronological order. In the example screen shown in FIG. 20, sets of information are arranged such that those having a later play date and time are shown at the top. The detailed screen of user A also includes friendship-established request date and time 109. When user B, in the detailed screen, performs an input operation using operation input unit 14 to cause the previous screen to be displayed, display control unit 1111 again causes display unit 13 to display the friend list screen.

After the friend registration is completed, when user A of game device 10A, who is the sender of the friend request, performs an input operation using operation input unit 14 to cause a friend list screen to be displayed, friend information acquiring unit 1109 of the game device sends a friend information request to friend management server 20 (step S23). On receiving the friend information request, friend information sending unit 216 of friend management server 20 generates friend information by referring to friend information DB 223, user information DB 221, game history DB 224, and game information DB 225 to send the generated friend information to game device 10A (step S24).

Figure 21:
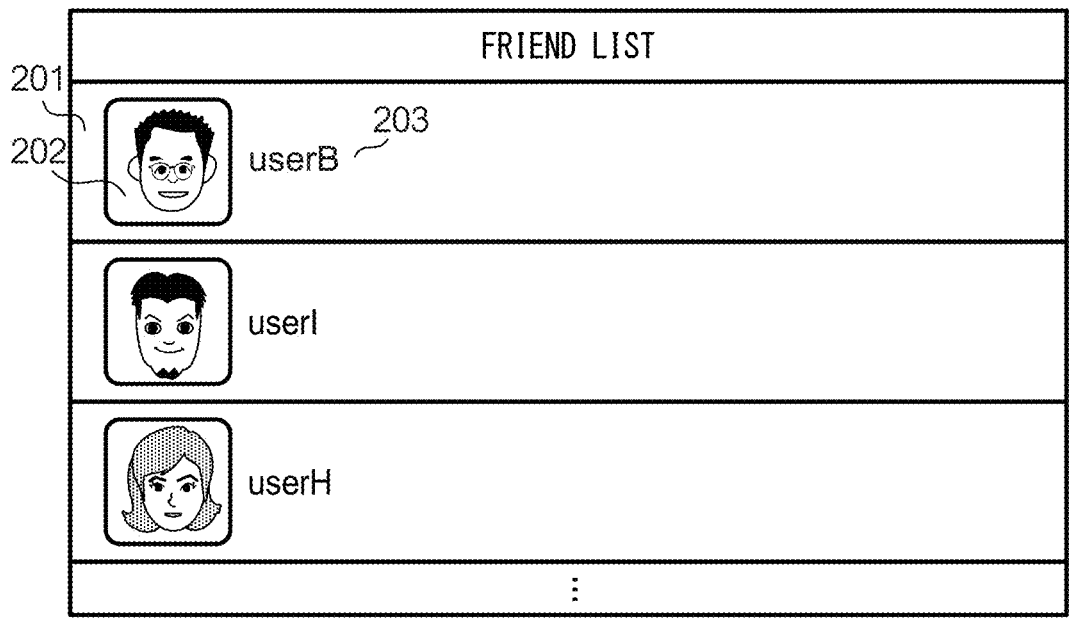
FIG. 21 is a diagram showing an example of a friend list screen.

When the friend information is acquired by friend information acquiring unit 1109 of game device 10A, screen generating unit 1110 of the game device generates a friend list screen based on the acquired friend information. After the friend list screen is generated, display control unit 1111 causes display unit 13 to display the generated screen (step S25). FIG. 21 is a diagram showing an example of the friend list screen.

The friend list screen is a screen showing a list of other users who are friends of user A, in which list the other friends are arranged on a friendship-established date and time basis in chronological order. In the example screen shown in FIG. 21, other users are arranged such that those having a later friendship-established date and time are shown at the top. In display area 201 of each of the other users, user image 202 and user name 203 of another user are shown. It is of note that in a modification, a friendship establishing method may be shown in association with user image 202 and user name 203 of another user. It is also of note that in another modification, online users may be shown above offline users.

Figure 22:
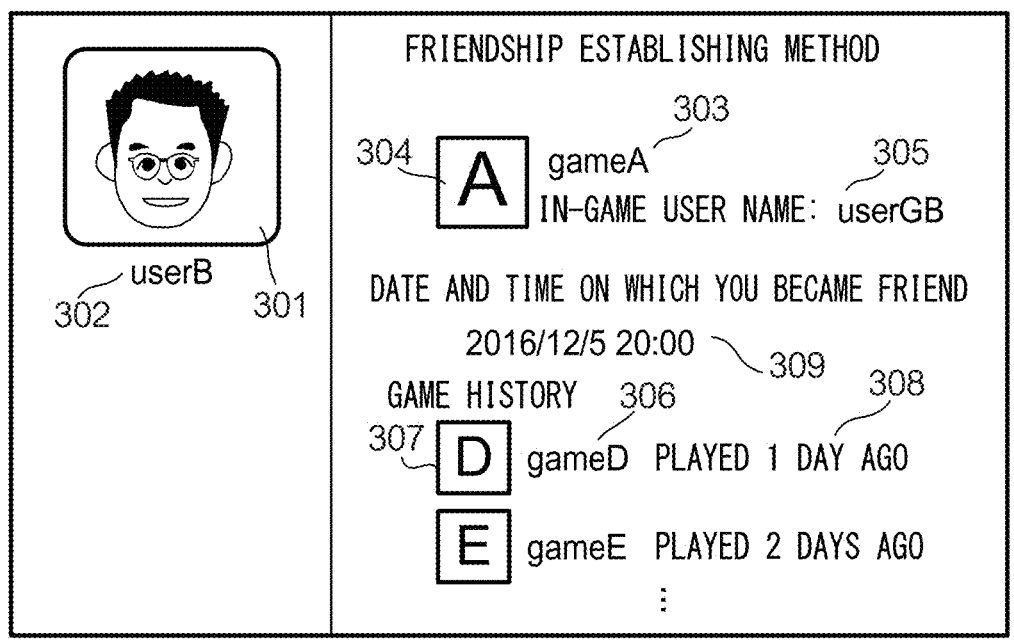
FIG. 22 is a diagram showing an example of a detailed screen for a friend.

When user A, in the friend list screen, selects user B using operation input unit 14, screen generating unit 1110 generates a detailed screen of user B based on the friend information acquired from friend management server 20. After the detailed screen is generated, display control unit 1111 causes display unit 13 to display the generated screen (step S26). FIG. 22 is a diagram showing an example of the detailed screen of user B, which screen can be displayed after user A and user B have established a friendship.

The detailed screen of user B is a screen showing identification information of user B, who is a friend of user A, and a friendship-establishing method by which a friendship has been established between user A and user B, in which screen a friendship-establishing method is shown instead of a request method. The identification information of user B includes user image 301 and user name 302 of user B. Information indicative of the friendship-establishing method includes game name 303, game image 304, and in-game user name 305 of user B, display of which items of information indicates that establishment of a friendship has been triggered by a multi-play session. The detailed screen of user B also includes a history of games played by user B, which history includes one or more sets of game name 306, game image 307, and play date and time 308, which sets of information are arranged on a play date and time basis in chronological order. In the example screen shown in FIG. 22, sets of information are arranged such that those having a later play date and time are shown at the top. The detailed screen of user B also includes friendship-established request date and time 309. When user A, in the detailed screen, performs an input operation using operation input unit 14 to cause the previous screen to be displayed, display control unit 1111 again causes display unit 13 to display the friend list screen.

The foregoing is a description of the operation to register a friend.

According to information-processing system 1 described in the foregoing, a request method of a friend request is shown in a list of friend requests (see FIGS. 15 and 17) and a detailed screen (see FIGS. 16 and 18) of one of the friend requests; accordingly, a user of game device 10 is able to confirm a request method of a friend request that the user has sent or received. Also, a friendship-establishing method is shown in a detailed screen (see FIGS. 20 and 22) of a friend list; accordingly, a user of game device 10 is able to confirm a friendship-establishing method of his/her friend.

In contrast to the above exemplary operation, which enables friend registration using a multi-play history, in an operation that enables friend registration using local communication, a detailed screen (see FIGS. 16 and 18) of a list of friend requests shows, instead of a game name, a game image, and an in-game user name; for example, a message "Establishment of friendship requested using local communication" to indicate a request method. A detailed screen (see FIGS. 20 and 22) of a friend list shows, instead of a game name, a game image, and an in-game user name; for example, a message "Friendship established using local communication" to indicate a friendship-establishing method. In another operation that enables friend registration using a friend code, a detailed screen (see FIGS. 16 and 18) of a list of friend requests shows, instead of a game name, a game image, and an in-game user name; for example, a message "Establishment of friendship requested using friend code" to indicate a request method. A detailed screen (see FIGS. 20 and 22) of a friend list shows, instead of a game name, a game image, and an in-game user name; for example, a message "Friendship established using friend code" to indicate a friendship-establishing method. In another operation that enables friend registration during a game play, a request method and a friendship-establishing method are shown in the same manner as in the above exemplary operation that enables friend registration using a multi-play history.

2. Modifications

The above embodiment may be modified as described below. It is of note that two or more modifications described below may be combined with each other.

2-1. Modification 1

The friend registration program executed in game device 10 may be executed in an information-processing device such as a smartphone, a tablet device, or a wearable device. Functions of game device 10 may be provided by information-processing devices connected by a communication line (in other words, an information-processing system). Similarly, functions of friend management server 20 may be provided by information-processing devices connected by a communication line (in other words, an information-processing system).

2-2. Modification 2

In the multi-play history list screen shown in FIG. 13, a communication method used for a multi-play session may be shown in association with another user's identification information, which communication method may be made identifiable based on, for example, text, or a color, size, or position of user identification information.

2-3. Modification 3

In the multi-play history list screen shown in FIG. 13, items of another user's identification information may be arranged on the basis of a communication method used for a multi-play session; in other words, items of other users' identification information sharing a communication method may be grouped together and shown. Such an arrangement may be performed in response to a user's input operation after items of other users' identification information have been arranged in chronological order.

2-4. Modification 4

After the multi-play history list screen shown in FIG. 13 is displayed, display control unit 1111, in response to a user's selection of a communication method, may cause display unit 13 to display another screen showing only items of identification information of other users, who have performed a multi-play session using the selected communication method. In essence, display control unit 1111 may cause display unit 13 to display items of other users' identification information that have been selected on a communication method basis.

2-5. Modification 5

In the detailed screen of user B shown in FIG. 14, in a case where user A and user B have played plural games together, game names, game images, and in-game user names of the plural games may be shown. To enable plural games to be displayed, when user A and user B have played a game together plural times, old entries of multi-play sessions are not deleted from multi-play history DB 122 of game device 10.

2-6. Modification 6

Game device 10 may be shared by users. To enable this, plural accounts may be set up in game device 10. In that case, storage unit 12 stores multi-play history DB 122 for each of the plural accounts (in other words, user IDs).

2-7. Modification 7

In the list of friend requests shown in FIG. 15 or 17, friend requests may be arranged on a request method (specifically, channel type) basis; in other words, friend requests among which a request method is shared may be grouped together and shown. Such an arrangement may be performed in response to a user's input operation after friend requests have been arranged in chronological order. Similarly, in the friend list shown in FIG. 19 or 21, other users, who are friends, may be arranged on a friendship-establishing method (specifically, channel type) basis.

2-8. Modification 8

After the list of friend requests shown in FIG. 15 or 17 is displayed, display control unit 1111, in response to a user's selection of a request method (specifically, channel type), may cause display unit 13 to display another screen showing only friend requests that have been made using the selected request method. In essence, display control unit 1111 may cause display unit 13 to display friend requests that have been selected on a request method basis. Similarly, after the friend list shown in FIG. 19 or 21 is displayed, display control unit 1111, in response to a user's selection of a friendship-establishing method (specifically, channel type), may cause display unit 13 to display another screen showing only friends, a friendship with whom has been established using the selected friendship-establishing method.

2-9. Modification 9

In the detailed screen of a friend request list shown in FIG. 16 or 18, a request method may be shown in a manner such that a viewer can identify a sender or receiver of a friend request. For example, in the detailed screen shown in FIG. 16, a message "Friend request to user with whom you played together" may be shown to indicate a request method. In the detailed screen shown in FIG. 18, a message "Friend request from user with whom you played together" may be shown to indicate a request method. Similarly, in the detailed screen of a friend list shown in FIG. 20 or 22, a friendship-establishing method may be shown in a manner such that a viewer can identify a sender or receiver of a friend request. For example, in the detailed screen shown in FIG. 20, a message "Friendship established based on friend request from user with whom you played together" may be shown to indicate a friendship-establishing method. In the detailed screen shown in FIG. 22, a message "Friendship established based on friend request to user with whom you played together" may be shown to indicate a friendship-establishing method.

2-10. Modification 10

In the detailed screen of a friend request list shown in FIG. 16 or 18, two or more request methods may be shown. Specifically, in a case where establishment of a friendship has been requested using local communication, and a user ID of a receiver of the friend request is registered in multi-play history DB 122, not only a message "Friend request sent using local communication" but also a game name, a game image, and an in-game user name of a game played with the receiver may be shown to indicate a request method. In that case, two or more friendship-establishing methods may be shown in the detailed screen of a friend list shown in FIG. 20 or 22.

2-11. Modification 11

In the detailed screen of a friend request list shown in FIG. 18, not only a game name and a play date and time but also a length of play time and the number of sessions may be shown to indicate a game history. To enable such a display, game history DB 121 of game device 10 and game history DB 224 of friend management server 20 are configured to record lengths of play time. Similarly, in the detailed screen of a friend list shown in FIG. 20 or 22, a length of play time and the number of sessions may be shown.

2-12. Modification 12

In the detailed screen of a friend request list shown in FIG. 16, in a case where a sender of a friend request is a friend of another user, who is a friend of a receiver of the friend request, identification information of the other user may be shown. To enable such a display, friend management server 20 that has received a friend request and identified a friend common to a sender and a receiver of the received friend request, by referring to friend information DB 223, may include identification information of the identified friend in sent-request information so that the identification information may be shown in the detailed screen shown in FIG. 16. Alternatively, a sender of a friend request, who has selected a receiver from a friend list of his/her friend, may include identification information of the friend in the friend request sent to friend management server 20, and the friend management server may include the identification information in sent-request information so that the identification information may be shown in the detailed screen shown in FIG. 16. It is of note that identification information of a common friend may be shown in the detailed screen of a friend request list shown in FIG. 18, or in the detailed screen of a friend list shown in FIG. 20 or 22.

2-13. Modification 13

A request method and a friendship-establishing method are not limited to a method using local communication, a method using a multi-play function, and a method using a friend code; the methods may refer to, for example, a method in which a friend list is referred to, which list is managed by a service different from the friend registration service provided by information-processing system 1. The friend list managed by a different service is, in other words, a friend list in which identification information of friends is registered under a system (or by a service) different from friend management server 20, and more specifically, a friend list in which identification information of friends is registered on a platform different from that of friend management server 20 through execution of a program different from that of the server. The friend list may refer to, for example, a friend list of a service such as Facebook (registered trademark) or Twitter (registered trademark). In the method in which a friend list managed by a different service is referred to, game device 10 of a sender of a friend request acquires identification information of a friend of the sender, registered in the friend list, based on which identification information establishment of a friendship is requested.

2-14. Modification 14

Friend management server 20, upon detecting that two users exchange friend requests using a shared request method, may automatically register the sender and the receiver as friends, without obtaining approval of either of the friend requests. The request method refers to, specifically, a channel type. In the present modification, friend management server 20, on receiving a friend request from game device 10, determines whether a friend request has been sent to a sender of the friend request from a receiver of the friend request, by referring to friend request information DB 222; namely, friend management server 20 determines whether friend requests have been exchanged. As a result of the determination, when friend requests have been exchanged, friend management server 20 determines whether the exchanged friend requests share a channel type. As a result of the determination, when the exchanged friend requests share a channel type, friend management server 20 registers the sender and the receiver of the friend requests as friends. For example, in a case where user A has sent a friend request using a friend code to user B, and user B has sent a friend request using a friend code to user A, friend management server 20 automatically registers user A and user B as friends, without obtaining approval from user A or user B. It is of note that in a case where the channel type of both the friend requests indicates a method using a multi-play history, and games specified in the friend request are different, friend management server 20 may automatically register the sender and the receiver of the friend requests as friends. When either one of the above two determinations is negative, friend management server 20 does not automatically perform a friend registration.

2-15. Modification 15

The friend registration program stored in game device 10 or friend management server 20 may be distributed using a computer-readable non-transitory storage medium, which includes a magnetic storage medium such as a magnetic tape or a magnetic disk, an optical storage medium such as an optical disk, a magneto-optical storage medium, or a semiconductor memory. Alternatively, the program may be distributed via a network such as the Internet.

What is claimed is:

1. An information-processing device, comprising:
   a processor; and
   a memory storing computer readable instructions that, when executed by the processor, cause the information-processing device to:
     request establishment of a friendship, as a relationship established based on a mutual agreement between users, using one of plural methods;
     cause a display to display one of a request method by which establishment of the friendship has been requested, and an establishing method by which the friendship has been established; and
     cause the display to further display a list having a plurality of friend requests, each displayed friend request in the plurality of friend requests including at least a user identification, wherein
     each method from the plural methods obtains information for establishing the friendship using different techniques depending upon the method selected, and
     one or more displayed friend requests including a request method displayed in association with the displayed user identification, the request method stored in a database in association with the user identification and indicative of a method by use of which establishment of the friendship has been requested.

2. The information-processing device according to claim 1, wherein the instructions, when executed by the processor, further cause the information-processing device to, after establishment of the friendship has been requested, cause the display to display the request method, and to, after the friendship has been established, cause the display to display the establishing method, instead of the request method.

3. The information-processing device according to claim 1, wherein the instructions, when executed by the processor, further cause the information-processing device to cause the display to display at least one of a first method, a second method, a third method, and a fourth method as the request method or the establishing method, wherein:
   the first method is a method by which establishment of the friendship is requested using first information of another user, the first information being acquired by the information-processing device from another information-processing device via near field communication;
   the second method is a method by which establishment of the friendship is requested using second information of the other user, the second information being input into the information-processing device by a user of the information-processing device;
   the third method is a method by which establishment of the friendship is requested using third information of the other user, the third information being acquired by the information-processing device to enable the user to play a game with the other user; and
   the fourth method is a method by which establishment of the friendship is requested using fourth information of the other user, the fourth information being acquired by the information-processing device, the other user being registered as a friend of the user of the information-processing device in a system or service different from the information-processing device.

4. The information-processing device according to claim 3, wherein the instructions, when executed by the processor, further cause the information-processing device to cause the display to display information on the game to indicate the third method as the request method or the establishing method.

5. The information-processing device according to claim 3, wherein the instructions, when executed by the processor, further cause the information-processing device to cause the display to display information used in the game on the user of the information-processing device or on the other user to indicate the third method as the request method or the establishing method.

6. The information-processing device according to claim 3, wherein the instructions, when executed by the processor, further cause the information-processing device to cause the display to display two or more of the first to the fourth methods as the request method or the establishing method.

7. The information-processing device according to claim 1, wherein the instructions, when executed by the processor, further cause the information-processing device to cause the display to display the request method or the establishing method in a manner such that a sender or receiver of the friend request can be identified.

8. The information-processing device according to claim 1, wherein the instructions, when executed by the processor, further cause the information-processing device to cause the display to display the request method and information on another user, the other user being a friend of a user of the information-processing device and of yet another user.

9. An information-processing system, comprising:
at least one server; and
at least one information-processing device in communication with the at least one server, the at least one information-processing device having processing circuitry including at least a processor and a memory, the processing circuitry configured to:
request establishment of a friendship, as a relationship established based on a mutual agreement between users, using one of plural methods;
cause a display to display one of a request method by which establishment of the friendship has been requested, and an establishing method by which the friendship has been established; and
cause the display to further display a list having a plurality of friend requests, each displayed friend request in the plurality of friend requests including at least a user identification, wherein
each method from the plural methods obtains information for establishing the friendship using different techniques depending upon the method selected, and
one or more displayed friend requests including a request method displayed in association with the displayed user identification, the request method stored in a database in association with the user identification and indicative of a method by use of which establishment of the friendship has been requested.

10. An information-processing method carried out by an information-processing device, the method comprising:
requesting establishment of a friendship, as a relationship established based on a mutual agreement between users, using one of plural methods;
causing a display to display one of a request method by which establishment of the friendship has been requested, and an establishing method by which the friendship has been established; and
causing the display to further display a list having a plurality of friend requests including, each displayed friend request in the plurality of friend requests including at least a user identification, wherein
each method from the plural methods obtains information for establishing the friendship using different techniques depending upon the method selected, and
one or more displayed friend requests including a request method displayed in association with the displayed user identification, the request method stored in a database in association with the user identification and indicative of a method by use of which establishment of the friendship has been requested.

11. A non-transitory storage medium storing a program for causing a computer to execute a process, the process comprising:
requesting establishment of a friendship, as a relationship established based on a mutual agreement between users, using one of plural methods;
causing a display to display one of a request method by which establishment of the friendship has been requested, and an establishing method by which the friendship has been established; and
causing the display to further display a list having a plurality of friend requests, each displayed friend request in the plurality of friend requests including at least a user identification, wherein
each method from the plural methods obtains information for establishing the friendship using different techniques depending upon the method selected, and
one or more displayed friend requests including a request method displayed in association with the displayed user identification, the request method stored in a database in association with the user identification and indicative of a method by use of which establishment of the friendship has been requested.

12. The information-processing device according to claim 1, wherein the plural methods for establishing friendship include at least a local communication method, a multi-player method, and a friend code method.

13. The information-processing device according to claim 12, wherein establishing the friendship using the local communication method includes generating a friend request using a first user identifier corresponding to a user of the information-processing device and using a second user identifier corresponding to a user of another information-processing device.

14. The information-processing device according to claim 12, wherein establishing the friendship using the multi-player method includes generating a friend request using a first user identifier corresponding to a user of the information-processing device, and a combination of a second user identifier corresponding to a user of another information-processing device, a game identifier, and an in-game user name of the user of the another information-processing device.

15. The information-processing device according to claim 14, wherein the second user identifier, the game identifier, and the in-game user name are obtained from a multi-play history database.

16. The information-processing device according to claim 12, wherein establishing the friendship using the friend code method includes generating a friend request using a first user identifier corresponding to a user of the information-processing device and using a second user identifier corresponding to a user of another information-processing device, the second user identifier obtained by inputting a friend code and obtaining the second user identifier from a server based on the input friend code.

17. The information-processing device according to claim 1, wherein the display further includes a game history in addition to the request method by which establishment of the friendship has been requested.

18. The information-processing device according to claim 1, wherein each displayed request method is selected from a predefined group of different request methods.

19. The information-processing device according to claim 1, wherein the user identification in each displayed friend request includes, at least, a user image and a user name, and each displayed request method includes, at least, an application name.

20. The information-processing device according to claim 1, wherein each displayed request method is displayed as at least one of a game name, a game image, or an in-game user name of a friend request.

\* \* \* \* \*